US008040593B2

(12) United States Patent
Nam et al.

(10) Patent No.: US 8,040,593 B2
(45) Date of Patent: Oct. 18, 2011

(54) TRANSFLECTIVE DISPLAY APPARATUS USING DIELECTROPHORESIS AND METHOD OF MANUFACTURING THE TRANSFLECTIVE DISPLAY APPARATUS

(75) Inventors: Yun-woo Nam, Yongin-si (KR); Dae-ho Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 57 days.

(21) Appl. No.: 12/654,346

(22) Filed: Dec. 17, 2009

(65) Prior Publication Data
US 2010/0195187 A1 Aug. 5, 2010

(30) Foreign Application Priority Data

Feb. 2, 2009 (KR) ........................ 10-2009-0008044

(51) Int. Cl.
G02B 26/00 (2006.01)

(52) U.S. Cl. ....................................................... 359/296
(58) Field of Classification Search .................. 359/296; 345/107
See application file for complete search history.

(56) References Cited

U.S. PATENT DOCUMENTS

2010/0177374 A1* 7/2010 Nam .............................. 359/296
2010/0188317 A1* 7/2010 Nam ............................... 345/76

* cited by examiner

*Primary Examiner* — David N Spector
(74) *Attorney, Agent, or Firm* — Harness, Dickey & Pierce, P.L.C.

(57) ABSTRACT

Example embodiments relate to a transflective display apparatus using dielectrophoresis and a method of manufacturing the transflective display apparatus. The display apparatus may include a display panel; a backlight unit providing the display panel with light for forming an image; and a reflective plate arranged under the backlight unit. The reflective plate may reflect external light incident thereon via the display panel back to the display panel. The display panel may include a plurality of pixel areas transmitting or blocking light using dielectrophoresis.

20 Claims, 8 Drawing Sheets

US 8,040,593 B2

TRANSFLECTIVE DISPLAY APPARATUS USING DIELECTROPHORESIS AND METHOD OF MANUFACTURING THE TRANSFLECTIVE DISPLAY APPARATUS

CROSS-REFERENCE TO RELATED APPLICATION

This application claims priority under 35 U.S.C. §119 to Korean Patent Application No. 10-2009-0008044, filed on Feb. 2, 2009 with the Korean Intellectual Property Office (KIPO), the disclosure of which is incorporated herein in its entirety by reference.

BACKGROUND

1. Field

Example embodiments relate to a display apparatus using dielectrophoresis and a method of manufacturing the display apparatus.

2. Description of the Related Art

Portable devices (e.g., cellular phones, personal digital assistants (PDAs), portable multimedia players (PMPs), Digital Multimedia Broadcasting (DMB) devices, and the like) have experienced a relatively rapid increase in supply and availability. As a result, displays having lower power consumption and improved external visibility have also increased in demand.

According to such demands, research has been actively conducted on a transflective liquid crystal display (LCD) manufactured by combining functions of a reflective display device and a transmissive display device. Because the transflective LCD forms an image by using light from a backlight unit and/or external light, visibility of a display with the transflective LCD may be obtained even when the display is used in a bright environment (e.g., sunny environment), and power consumption may be reduced. However, in a transflective LCD, an area of a liquid cell is divided into two areas which are respectively allocated to a reflective area and a transmissive area. Consequently, the manufacturing procedure is more complicated. Also, because the incident light is divided and used, the brightness of the display may be lowered.

SUMMARY

Example embodiments relate to a transflective display apparatus using dielectrophoresis and a method of manufacturing the transflective display apparatus.

A display apparatus according to example embodiments may include a display panel having a plurality of pixel areas configured to transmit or block light by using dielectrophoresis; a backlight unit configured to provide the display panel with light for forming an image; and a reflective plate arranged under the backlight unit so as to reflect external light, which is incident on the reflective plate via the display panel, back to the display panel.

The display panel may include a first substrate and a second substrate arranged so as to face each other; a hydrophobic insulating layer on the first substrate; a hydrophobic pattern electrode unit arranged on areas of the hydrophobic insulating layer to form a non-uniform electric field according to an applied voltage, the areas corresponding to the plurality of pixel areas; and a hydrophilic dielectric medium with hydrophobic uncharged particles therein in a space between the first substrate and the second substrate.

The display apparatus may further include a hydrophilic grid arranged on the hydrophobic insulating layer so as to define the plurality of pixel areas. The hydrophobic pattern electrode unit may include a plurality of electrically-separated electrode areas configured to produce a relatively strong electric field between neighboring electrode areas.

A method of manufacturing a display apparatus according to example embodiments may include forming a hydrophobic insulating layer on a first substrate; defining a plurality of pixel areas on the hydrophobic insulating layer; forming a hydrophobic pattern electrode unit configured to produce a non-uniform electric field in each of the plurality of pixel areas according to an applied voltage; forming a hydrophilic dielectric medium in each of the plurality of pixel areas, the hydrophilic dielectric medium having hydrophobic uncharged particles distributed therein; arranging a backlight unit under the first substrate; and arranging a reflective plate under or on/over the backlight unit.

The method may further include forming a hydrophilic grid to define the plurality of pixel areas. Forming the hydrophilic dielectric medium may include forming a spacer to surround at least a portion of the periphery of the plurality of pixel areas; forming a second substrate on the spacer to create a space defined by the first substrate, the spacer, and the second substrate; and injecting the hydrophilic dielectric medium with the hydrophobic uncharged particles distributed therein into the space.

BRIEF DESCRIPTION OF THE DRAWINGS

The above and/or other aspects of example embodiments may become more apparent and readily appreciated when the following description is taken in conjunction with the accompanying drawings of which.

DETAILED DESCRIPTION

Figure 1:
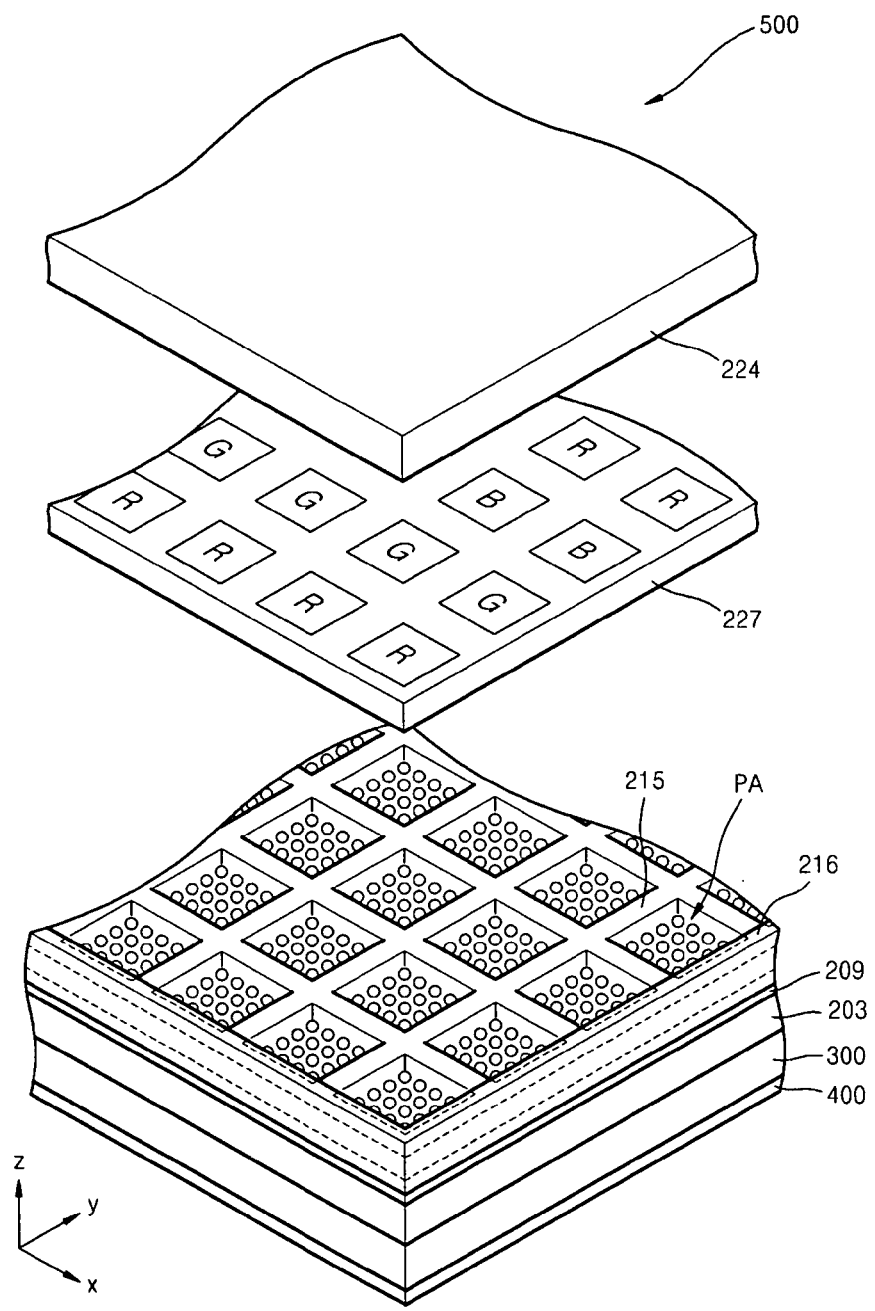
FIG. 1 is an exploded perspective view of a display apparatus according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Because the display apparatus according to example embodiments uses dielectrophoresis, the phenomenon of dielectrophoresis will be briefly discussed before the more detailed description of example embodiments. Dielectrophoresis is a phenomenon in which an uncharged dielectric particle (in a dielectric medium which is subjected to an non-uniform electric field) has an induced dipole moment. As a result of a difference between a dielectric constant of the dielectric particle and a dielectric constant of the dielectric medium, a force is generated and exerted on the dielectric particle, so that the dielectric particle moves either in response to a relatively strong electric field area or a relatively weak electric field area. For instance, a dielectric particle having a dielectric constant greater than the dielectric constant of the dielectric medium will move in response to a relatively strong electric field area. On the other hand, a dielectric particle having a dielectric constant less than the dielectric constant of the dielectric medium will move in response to the relatively weak electric field area. As described in further detail below, example embodiments use the aforementioned principle of dielectrophoresis to transmit or block external light so as to form an image.

Figure 2A:
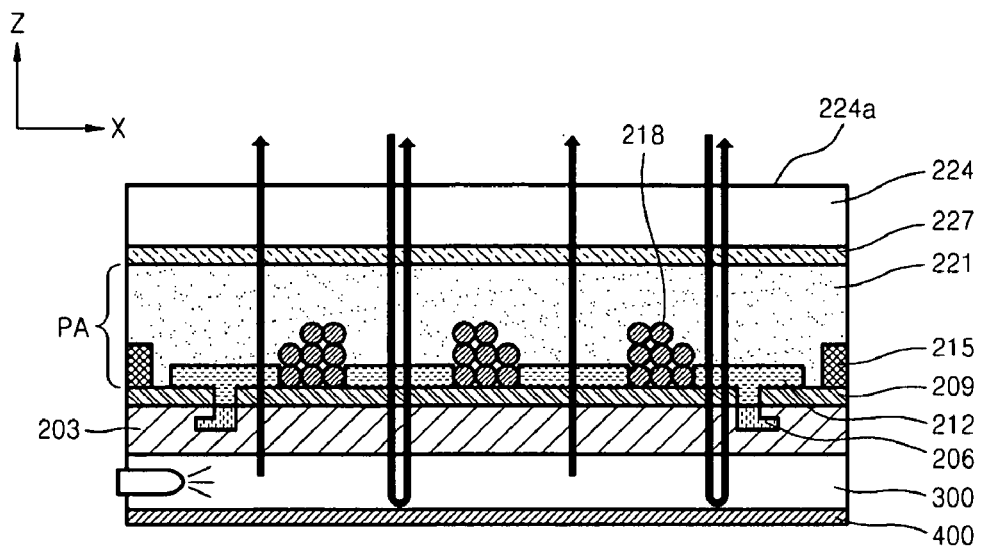
FIGS. 2A and 2B are cross-sectional views of a pixel area in the display apparatus of FIG. 1, illustrating a transflective mode for transflecting light and a block mode for blocking light, respectively.
Figure 2B:
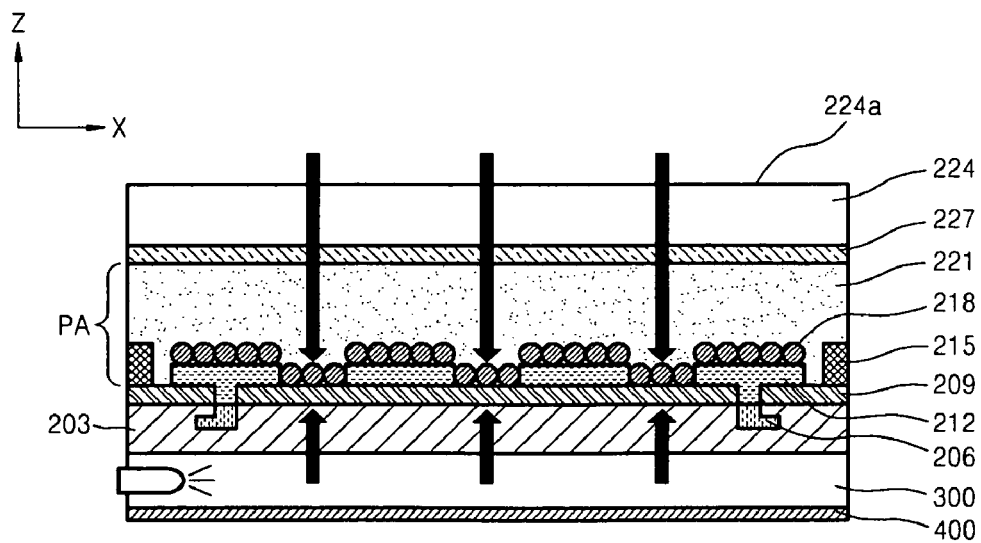
Figure 3:
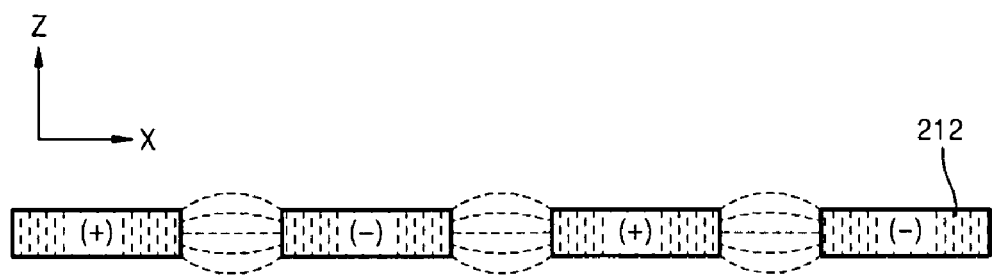
FIG. 3 is a diagram of a relatively strong electric field area formed in the transflective mode of FIG. 2A.
Figure 4:
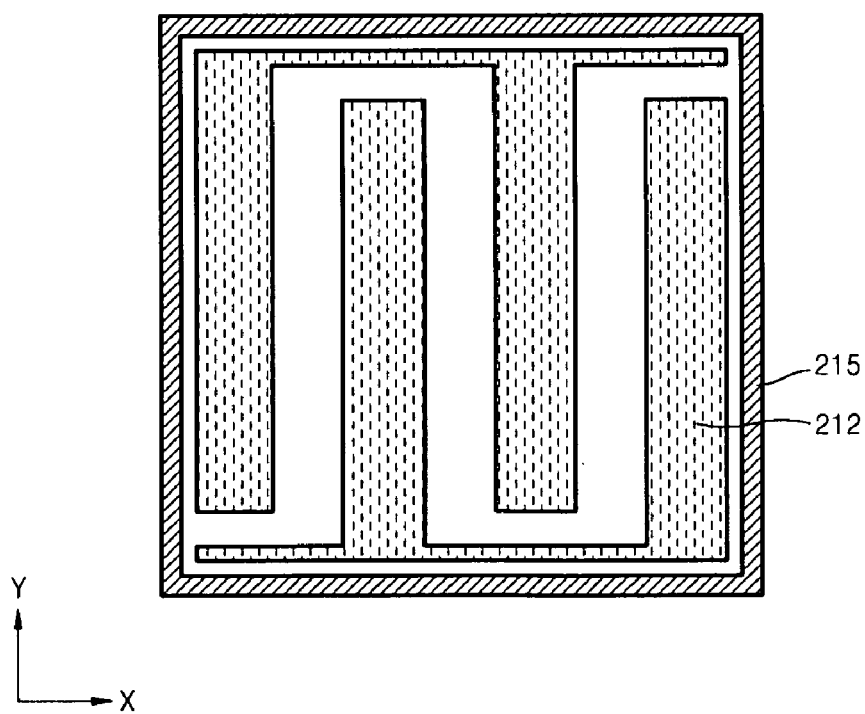
FIG. 4 is a plan view of a hydrophobic pattern electrode unit according to example embodiments.
Figure 5:
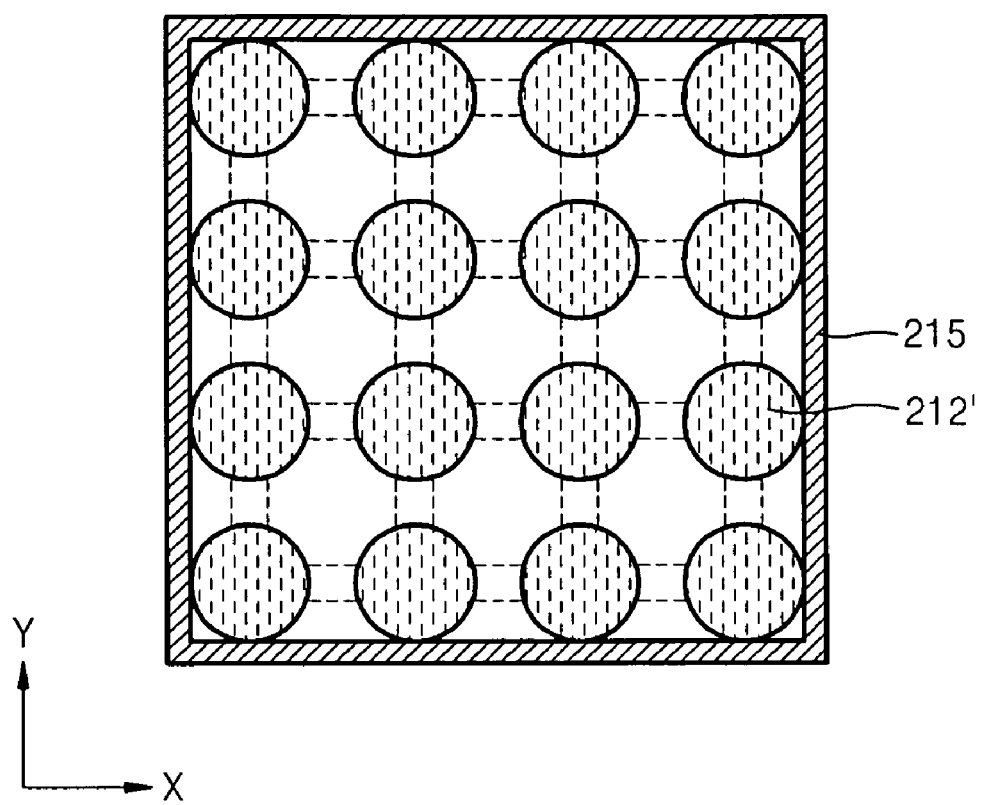
FIG. 5 is a plan view of another hydrophobic pattern electrode unit according to example embodiments.

FIG. 1 is an exploded perspective view of a display apparatus 500 according to example embodiments. FIGS. 2A and 2B are cross-sectional views of a pixel area PA in the display apparatus 500 of FIG. 1, illustrating a transflective mode for transflecting light and a block mode for blocking light, respectively. FIG. 3 is a diagram of a relatively strong electric field area formed in the transflective mode of FIG. 2A. FIGS. 4 and 5 are plan views of examples of hydrophobic pattern electrode units that may be employed in the display pixel 500 of FIG. 1.

Referring to FIGS. 1, 2A, and 2B, the display apparatus 500 may include a display panel, a backlight unit 300, and a reflective plate 400. The display panel may include a pixel area PA for transmitting or blocking light by using the phenomenon of dielectrophoresis. The pixel area PA may include sub-pixel areas for forming red, green, and blue colors and may be arranged in a two-dimensional array as illustrated in FIG. 1. The backlight unit 300 functions to provide the display panel with light for forming an image and may have a structure including a light source and a light guide plate. The reflective plate 400 functions to reflect external light, which is incident thereon via the display panel, back to the display panel and may be arranged under or on/over the backlight unit 300.

A structure of the display panel will now be described in further detail. The display panel may include first and second substrates 203 and 224 arranged so as to face each other, a hydrophobic insulating layer 209 formed on the first substrate 203, a hydrophobic pattern electrode unit 212 formed on the hydrophobic insulating layer 209, and a hydrophilic dielectric medium 221 injected into a space between the first substrate 203 and the second substrate 224, the hydrophilic dielectric medium 221 having hydrophobic uncharged particles 218 distributed therein.

A color filter 227 for forming a color image may be further arranged on one surface (e.g., lower surface) of the second substrate 224. The color filter 227 may have a plurality of color areas. For example, the color filter 227 may have a structure in which red (R), green (G), and blue (B) color areas are arrayed in a two-dimensional manner, wherein the color areas transmit only the corresponding color light from the incident light and absorb the remainder of the incident light. The other surface (e.g., upper surface) of the second substrate 224 may act as an image display surface 224a.

The first and second substrates 203 and 224 may be formed of a light transmissive material (e.g., glass, PEN (polyethylene naphthalate), PET (polyethylene terephthalate)). The hydrophobic insulating layer 209 may be formed of a material that may include at least one of BCB (Benzocyclobutene), polycarbonate, PMMA (polymethyl methacrylate), and poly (vinyl cinnamate), Teflon, and SiO2. The hydrophobic pattern electrode unit 212 may be formed of a material that may include at least one of EDOT(ethylenedioxythiophene), PEDOT-PSS (polyethylene(3,4-dioxythiophene)/polystyrene sulfonate), polyaniline, ITO (indium tin oxide). As the hydrophilic dielectric medium 221, a liquid medium having a relatively low conductivity (e.g., deionized water (DI water)) may be used, and the hydrophobic uncharged particles 218 may be formed of polymer particles (e.g., polystyrene).

The space above the hydrophobic insulating layer 209 may be divided into a plurality of pixel areas PA. For example, the plurality of pixel areas PA may be arranged in a two-dimensional array by a hydrophilic grid 215. In addition, a spacer 216 may be arranged along a periphery of the hydrophobic insulating layer 209 so as to surround the plurality of pixel areas PA. The plurality of pixel areas PA respectively correspond to the color areas R, G, and B of the color filter 227. The hydrophilic grid 215 is arranged to separate the hydrophobic uncharged particles 218 which are arranged in each of the plurality of pixel areas PA. For instance, the hydrophobic uncharged particles 218 may be repulsed by the hydrophilic grid 215 such that the hydrophobic uncharged particles 218 stay relatively close to the hydrophobic insulating layer 209 and/or the hydrophobic pattern electrode unit 212 so as to avoid the hydrophilic grid 215. As a result, the possibility of the hydrophobic uncharged particles 218 moving to a neighboring pixel area PA may be reduced or prevented.

The hydrophobic pattern electrode unit 212 may be formed in each of the plurality of pixel areas PA so as to produce a non-uniform electric field. When the non-uniform electric field is produced in the hydrophilic dielectric medium 221 by the hydrophobic pattern electrode unit 212, dielectrophoresis of the hydrophobic uncharged particles 218 occurs according to an electric field gradient so that a light transmittance of each of the plurality of pixel areas PA is adjusted. The hydrophobic pattern electrode unit 212 may include a plurality of electrode areas and may be formed in such a manner that a relatively strong electric field is formed between neighboring electrode areas. For example, referring to FIG. 3, a relatively strong electric field may be formed in an area, which is indicated as dotted lines of electric force, between neighboring electrode areas, and a relatively weak electric field compared to the area may be formed in other areas. The hydrophobic pattern electrode unit 212 for producing such an electric field gradient may have a structure in which the plurality of electrode areas alternate with each other to form comb-shaped patterns, as illustrated in FIG. 4. Alternatively, as illustrated in FIG. 5, a hydrophobic pattern electrode unit 212' may have a structure in which a plurality of electrode areas form a pattern of dots. In FIG. 5, areas indicated by dotted lines between the plurality of electrode areas in the pattern of dots may be areas having a relatively strong electric field.

An end of the hydrophobic pattern electrode unit 212 may be connected to a pixel electrode terminal 206 so that a voltage may be applied to the hydrophobic pattern electrode unit 212 via the pixel electrode terminal 206. A plurality of pixel electrode terminals 206 corresponding to the plurality of pixel areas PA may drive a pixel by using either an active matrix method or a passive matrix method according to an image signal. Details with regard to conventional components for driving pixels have been omitted from the drawings for purposes of brevity.

In the transflective mode in which incident light is transflected, a voltage is applied to the pixel electrode terminal 206 so that an electric field is formed in the hydrophilic dielectric medium 221. As a result, a relatively strong electric field may be formed in an area between neighboring electrodes in the hydrophilic dielectric medium 221. As illustrated in FIG. 2A, the hydrophobic uncharged particles 218 are locally concentrated in the area between neighboring electrodes. Thus, the incident light may pass through the space between the locally concentrated hydrophobic uncharged particles 218. The local density of the hydrophobic uncharged particles 218 may be adjusted by adjusting the voltage applied to the pixel electrode terminal 206, thereby adjusting a light transmittance of the pixel area PA.

As used herein, the incident light may refer to the light provided from the backlight unit 300 and the external light incident via the image display surface 224a. The incident external light passing through the pixel area PA may be reflected by the reflective plate 400 arranged under or on/over the backlight unit 300 so as to pass through the pixel area PA again, thereby exhibiting a corresponding color while passing through the color filter 227. In this manner, the external light may form an image via a reflective mode, and the light from the backlight unit 300 may form an image via a transmissive mode.

FIG. 2B is an illustration of a block mode in which the pixel area PA of the display panel in the display apparatus 500 blocks incident light. In this block mode, a voltage is not applied to the pixel electrode terminal 206. As a result, an electric field is not formed in the hydrophilic dielectric medium 221. In the absence of the electric field, the hydrophobic uncharged particles 218 remain relatively close to the hydrophobic insulating layer 209 and the hydrophobic pattern electrode unit 212 because of the repulsion against the hydrophilic dielectric medium 221. Consequently, the hydrophobic uncharged particles 218 may cover almost an entire surface of the pixel area PA. Thus, incident external light or light provided from the backlight unit 300 may be absorbed by the hydrophobic uncharged particles 218 rather than being emitted from the pixel area PA.

FIGS. 2A and 2B respectively illustrate the transflective mode and the block mode wherein light is transflected and blocked with respect to one pixel area PA. However, it should be understood that the display panel includes an array having a plurality of pixel areas PA, and each of the plurality of pixel areas PA may be driven in such a manner that a transmittance is adjusted according to information about an image to be formed. The display apparatus 500 forms the image by assembling such pixels. The display apparatus 500 according to FIG. 1 may form an image by using both the light from the backlight unit 300 and external light so that the display apparatus 500 has improved brightness and external visibility.

In the aforementioned description, a dielectric constant of the hydrophobic uncharged particles 218 is greater than that of the hydrophilic dielectric medium 221 such that the hydrophobic uncharged particles 218 are locally concentrated in a relatively strong electric field area. However, example embodiments are not limited thereto. For example, the dielectric constant of the hydrophobic uncharged particles 218 may be less than that of the hydrophilic dielectric medium 221 such that the hydrophobic uncharged particles 218 may be locally concentrated in a relatively weak electric field area. In both situations, the structure of the hydrophobic pattern electrode unit 212 may be appropriately determined by considering the difference between the dielectric constants of the hydrophobic uncharged particles 218 and the hydrophilic dielectric medium 221 and the distribution of electric field gradient such that the hydrophobic uncharged particles 218 may be locally concentrated in a relatively small local area when voltage is applied.

FIGS. 6A through 6J are cross-sectional views of a method of manufacturing the display apparatus 500 according to example embodiments. The method of manufacturing the display apparatus 500 may involve defining a plurality of pixel areas PA on the hydrophobic insulating layer 209, forming the hydrophobic pattern electrode unit 212 in each of the plurality of pixel areas PA in such a manner that a non-uniform electric field is produced according to an applied voltage, and forming a dielectric medium 221 in each of the plurality of pixel areas PA, wherein hydrophobic uncharged particles 218 are distributed in the dielectric medium 221. The method will be described in further detail below.

Figure 6A:
FIGS. 6A through 6J are cross-sectional views of a method of manufacturing a display apparatus according to example embodiments.

Referring to FIG. 6A, a first substrate 203 having a pixel electrode terminal 206 arranged therein may be formed. The first substrate 203 may be formed of a light transmissive material, e.g., a glass material or plastic materials including PEN (polyethylene naphthalate) or PET (polyethylene terephthalate). In FIG. 6A, only one pixel area is illustrated for purposes of brevity. It is not described in detail with respect to the first substrate 203 but components may further be formed to drive pixel electrode terminals 206 according to an image signal by using an active matrix method or a passive matrix method, wherein the pixel electrode terminals 206 respectively correspond to the pixel areas.

Figure 6B:
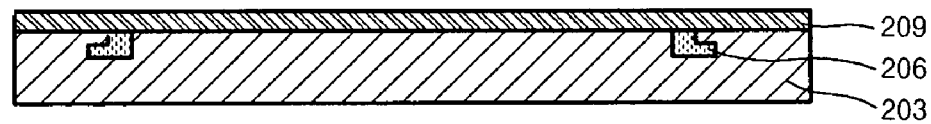

As illustrated in FIG. 6B, a hydrophobic insulating layer 209 may be formed on the first substrate 203. The hydrophobic insulating layer 209 may be formed by coating BCB (Benzocyclobutene), polycarbonate, PMMA (polymethyl methacrylate), poly(vinyl cinnamate), Teflon or SiO2.

Figure 6C:
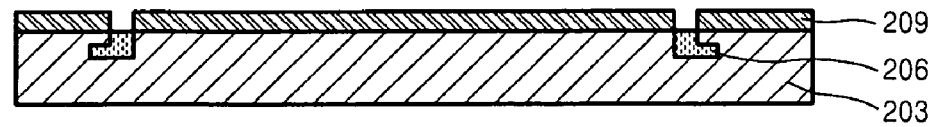

FIG. 6C corresponds to an operation in which a via-hole may be formed in the hydrophobic insulating layer 209 to provide a connection between the pixel electrode terminal 206 and a subsequently formed hydrophobic pattern electrode unit 212. The via-hole may be formed by performing a photolithography process or a reactive ionic etching (RIE) process.

Figure 6D:
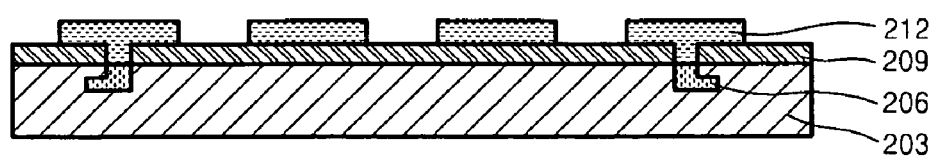

As illustrated in FIG. 6D, the hydrophobic pattern electrode unit 212 may be formed using a hydrophobic conductive material. The hydrophobic conductive material may include EDOT (3,4-ethylenedioxythiophene), PEDOT-PSS (poly(3,4-ethylenedioxythiophene) polystyrenesulfonate), polyaniline, ITO (indium tin oxide), and/or other suitable materials. The hydrophobic pattern electrode unit 212 has a selected pattern so as to form a non-uniform electric field.

Figure 6E:
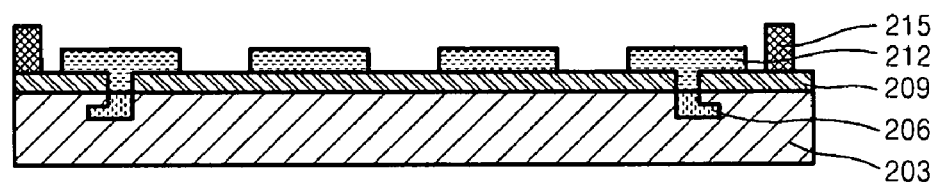

As illustrated in FIG. 6E, a hydrophilic grid 215 may be formed to define a pixel area. For example, silicon nitride ($SiN_x$) formed using plasma enhanced chemical vapor deposition (PECVD) or a photolithography process using SU-8 photoresist may be performed to form the hydrophilic grid 215.

Figure 6F:
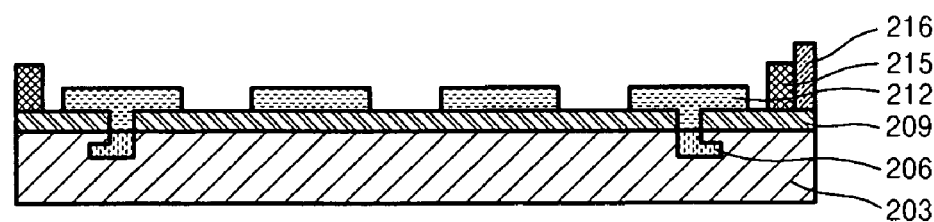

As illustrated in FIG. 6F, a spacer 216 may be formed along a periphery of the plurality of pixel areas so as to surround the plurality of pixel areas. However, to facilitate the subsequent injection of a dielectric medium, the spacer 216 may be formed so as to not entirely surround the plurality of pixel areas. The spacer 216 may be formed of a material that may include at least one of epoxy resin, thermoset acrylate resin, isocyanate resin, phenol resin, and acrylate-based oligomer.

Figure 6G:
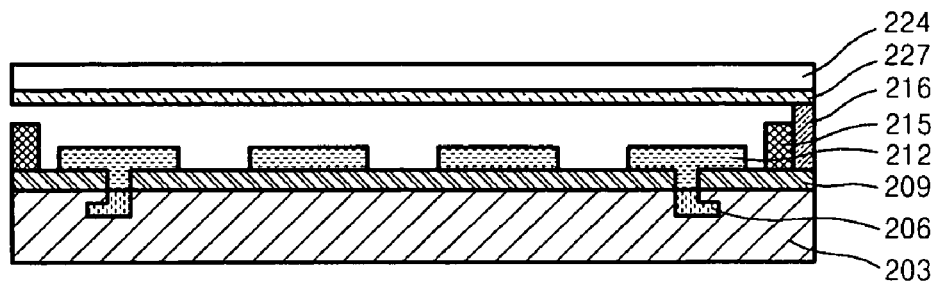

As illustrated in FIG. 6G, a second substrate 224 may be attached to the spacer 216. The second substrate 224 may be formed of a light transmissive material (e.g., a glass material or plastic materials including PEN (polyethylene naphthalate) or PET (polyethylene terephthalate)). A color filter 227 may be formed on one surface (e.g., lower surface) of the second substrate 224.

Figure 6H:
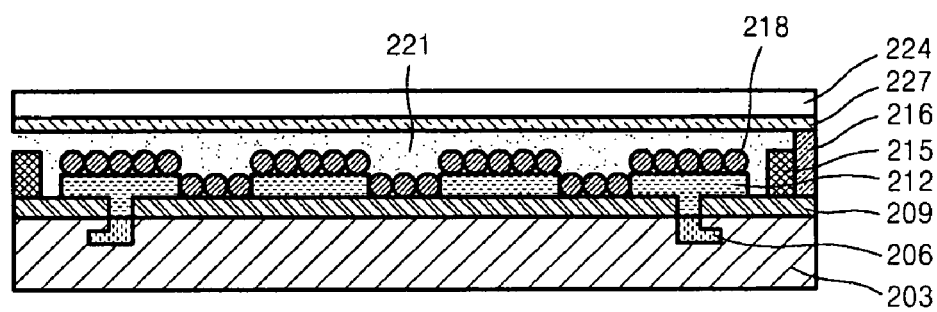

As illustrated in FIG. 6H, a hydrophilic dielectric medium 221 having hydrophobic uncharged particles 218 distributed therein may be injected into a space defined by the first substrate 203, the spacer 216, and the second substrate 224. As the hydrophilic dielectric medium 221, a liquid medium having a relatively low conductivity (e.g., deionized water (DI water)) may be used, and the hydrophobic uncharged particles 218 may be formed of polymer particles (e.g., black-colored polystyrene).

The method described above involves forming the second substrate 224 above the spacer 216 and then injecting the hydrophobic uncharged particles 218 and the hydrophilic dielectric medium 221. However, it should be understood that the injection may occur at a different time. For example, an alternative method may be to surround the entire periphery of the plurality of pixel areas with the spacer 216, to inject the hydrophobic uncharged particles 218 and the hydrophilic dielectric medium 221, and then to attach the second substrate 224 to the spacer 216.

Figure 6I:
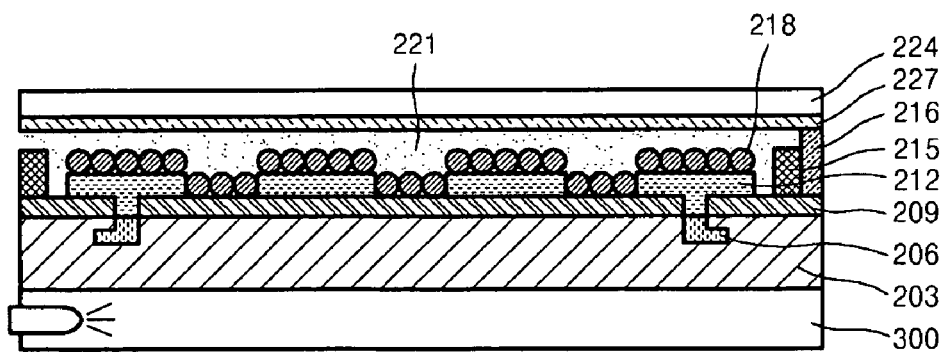
Figure 6J:
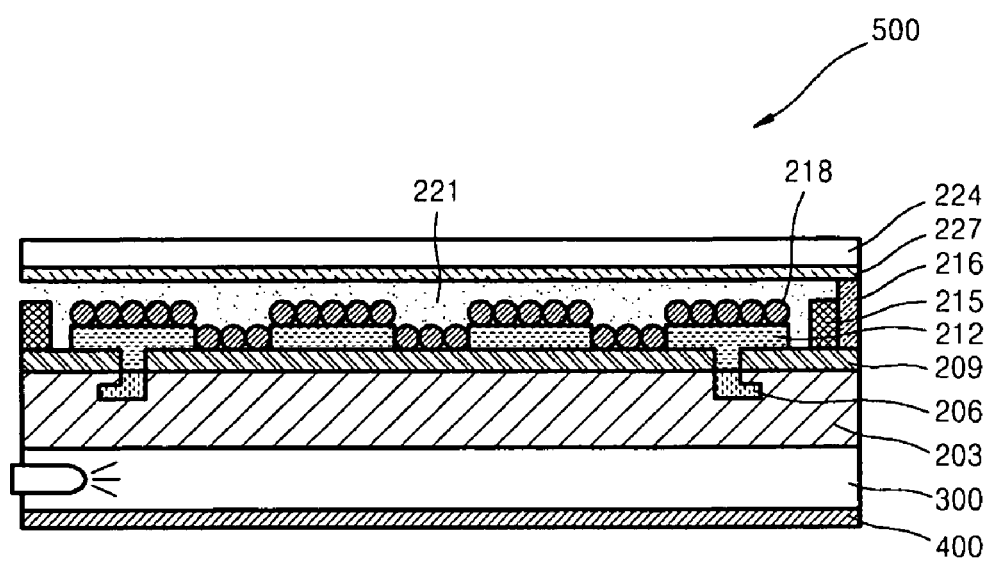

As illustrated in FIG. 6I, a backlight unit 300 may be attached under the first substrate 203, and as illustrated in FIG. 6J, a reflective plate 400 may be arranged under or on/over the backlight unit 300 so as to complete the display apparatus 500. It should be understood that the backlight unit 300 may be attached under the first substrate 203 in a different sequence. For example, the attachment may be performed when the first substrate 203 is arranged (e.g., in operation of FIG. 6A) such that the backlight unit 300 may be attached under the first substrate 203 prior to performing subsequent operations. Alternatively, the attachment may be performed just before the hydrophilic dielectric medium 221 with the hydrophobic uncharged particles 218 distributed therein are injected. Furthermore, the aforementioned attachment operations for attaching the backlight unit 300 under the first substrate 203 may be performed after the reflective plate 400 is attached under the backlight unit 300.

The display apparatus according to example embodiments may use particle movement resulting from dielectrophoresis so as to achieve a higher light efficiency and improved color realization compared to a conventional liquid crystal display (LCD). Also, when the particle movement occurs, residue from the movement may not be generated, and because material deterioration may not occur, the display apparatus may have a higher reliability. Furthermore, the display apparatus may use both illumination light from the backlight unit and external light as image forming light so as to provide improved external visibility and lower power consumption.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A display apparatus comprising:
a display panel having a plurality of pixel areas configured to transmit or block light using dielectrophoresis;
a backlight unit configured to provide the display panel with light for forming an image; and
a reflective plate arranged under the backlight unit so as to reflect external light, which is incident on the reflective plate via the display panel, back to the display panel.

2. The display apparatus of claim 1, wherein the display panel includes:
a first substrate and a second substrate arranged so as to face each other;
a hydrophobic insulating layer on the first substrate;

a hydrophobic pattern electrode unit arranged on areas of the hydrophobic insulating layer to form a non-uniform electric field according to an applied voltage, the areas corresponding to the plurality of pixel areas; and a hydrophilic dielectric medium with hydrophobic uncharged particles therein in a space between the first substrate and the second substrate.

3. The display apparatus of claim 2, wherein the hydrophilic dielectric medium is deionized water (DI water), and the hydrophobic uncharged particles are formed of polystyrene.

4. The display apparatus of claim 2, wherein the hydrophobic insulating layer is formed of a material selected from the group consisting of BCB (Benzocyclobutene), polycarbonate, PMMA (polymethyl methacrylate), poly(vinyl cinnamate), Teflon, SiO2, and mixtures thereof.

5. The display apparatus of claim 2, wherein the hydrophobic pattern electrode unit is formed of a material selected from the group consisting of EDOT (3,4-ethylenedioxythiophene), PEDOT-PSS (poly(3,4-ethylenedioxythiophene) polystyrenesulfonate), polyaniline, ITO (indium tin oxide), and mixtures thereof.

6. The display apparatus of claim 2, wherein a color filter is arranged on a surface of the second substrate.

7. The display apparatus of claim 2, further comprising:
a hydrophilic grid arranged on the hydrophobic insulating layer to define the plurality of pixel areas.

8. The display apparatus of claim 7, wherein the hydrophilic grid is formed of silicon nitride ($SiN_x$) or SU-8.

9. The display apparatus of claim 2, wherein the hydrophobic pattern electrode unit includes a plurality of electrically-separated electrode areas configured to produce an electric field between adjacent electrode areas.

10. The display apparatus of claim 9, wherein the plurality of electrode areas alternate with each other to form comb-shaped patterns.

11. The display apparatus of claim 9, wherein the plurality of electrode areas form a pattern of dots.

12. A method of manufacturing a display apparatus, comprising:
forming a hydrophobic insulating layer on a first substrate;
defining a plurality of pixel areas on the hydrophobic insulating layer;
forming a hydrophobic pattern electrode unit configured to produce a non-uniform electric field in each of the plurality of pixel areas according to an applied voltage;
forming a hydrophilic dielectric medium in each of the plurality of pixel areas, the hydrophilic dielectric medium having hydrophobic uncharged particles distributed therein;
arranging a backlight unit under the first substrate; and
arranging a reflective plate under the backlight unit.

13. The method of claim 12, wherein the hydrophilic dielectric medium is deionized water (DI water), and the hydrophobic uncharged particles are formed of polystyrene.

14. The method of claim 12, wherein the hydrophobic insulating layer is formed of a material selected from the group consisting of BCB (Benzocyclobutene), polycarbonate, PMMA (polymethyl methacrylate), poly(vinyl cinnamate), Teflon, SiO2, and mixtures thereof.

15. The method of claim 12, wherein the hydrophobic pattern electrode unit is formed of a material selected from the group consisting of EDOT (3,4-ethylenedioxythiophene), PEDOT-PSS (poly(3,4-ethylenedioxythiophene) polystyrenesulfonate), polyaniline, ITO (indium tin oxide), and mixtures thereof.

16. The method of claim 12, further comprising:
forming a hydrophilic grid to define the plurality of pixel areas.

17. The method of claim 16, wherein the hydrophilic grid is formed of silicon nitride ($SiN_x$) or SU-8.

18. The method of claim 12, wherein forming the hydrophilic dielectric medium includes:
forming a spacer to surround the plurality of pixel areas;
forming a second substrate on the spacer to create a space defined by the first substrate, the spacer, and the second substrate; and
injecting the hydrophilic dielectric medium with the hydrophobic uncharged particles distributed therein into the space.

19. The method of claim 18, wherein the spacer is formed of a material selected from the group consisting of epoxy resin, thermoset acrylate resin, isocyanate resin, phenol resin, acrylate-based oligomer, and mixtures thereof.

20. The method of claim 18, wherein a substrate having a color filter attached thereto is used as the second substrate.

* * * * *